June 4, 1946.  J. J. MANEWICH  2,401,307
COUNTERSINK
Filed Aug. 23, 1944
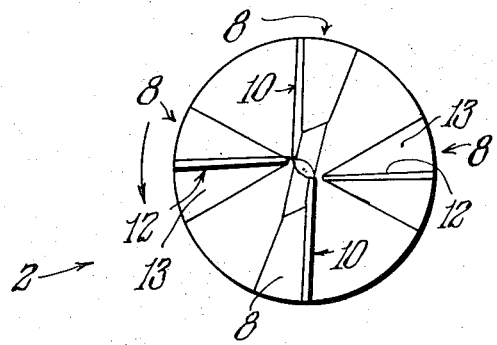
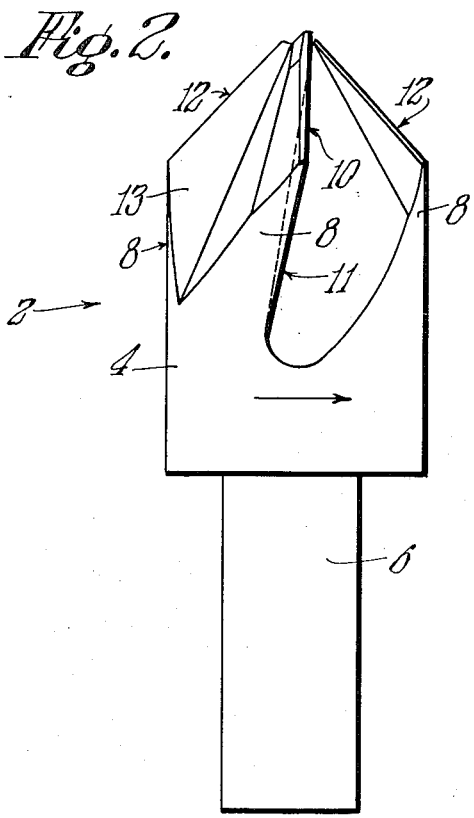
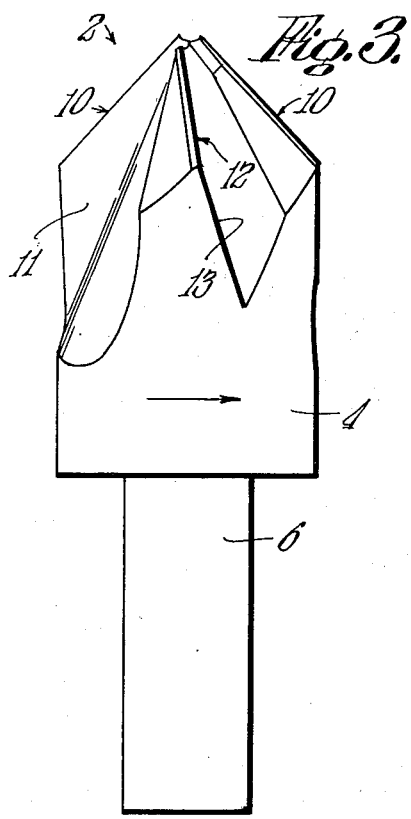
INVENTOR.
Joseph J. Manewich.
BY Walter C. Ross,
Attorney.

Patented June 4, 1946

2,401,307

UNITED STATES PATENT OFFICE 2,401,307

COUNTERSINK

Joseph J. Manewich, Longmeadow, Mass.

Application August 23, 1944, Serial No. 550,767

1 Claim. (Cl. 77—73.5)

This invention relates to improvements in tools and is directed more particularly to improvements in tools for producing countersunk holes.

The principal objects of the invention are directed to the provision of a countersink which by reason of its novel construction and arrangement effectively eliminates chatter, cuts more readily than prior art countersinks and at a higher cutting speed and produces countersink holes that are round, all of which is desirable.

Various novel objects and advantages of the invention will be hereinafter referred to in connection with the following description of the invention in the form at present preferred.

In the drawing:

Fig. 1 is an end view of a countersink tool embodying the novel features of the invention, and Figs. 2 and 3 are side elevational views of the tool shown in Fig. 1 looking at adjacent sides thereof.

Referring now to the drawing more in detail the invention will be fully described.

The countersink 2 of the invention includes a body 4 and a shank 6 adapted for engagement by a chuck or other rotating device for rotating the tool.

The body is gashed and otherwise formed to provide tooth portions 8. The portions 8 are machined, ground and otherwise processed to have cutting edges 10 and 12 arranged in pairs on opposite sides of the tool, as shown.

In operation the tool is rotated in the direction of the arrows, as shown, for countersinking operations and as shown in Figs. 2 and 3 the cutting edges 10 and 12 are angularly disposed or inclined outwardly away from the axis of rotation of the tool.

Inner portions of the cutting edges 10 adjacent the longitudinal axis of the tool, see Fig. 1, are disposed at opposite sides of a vertical plane passing through said axis. Likewise the corresponding portions of the cutting edges 12 are disposed at opposite sides of another plane passing through said axis. Or the inner portions of said cutting edges 10 which are closely adjacent the longitudinal axis of the tool are disposed forwardly of a plane passing between said cutting edges and through the longitudinal axis of the tool while the corresponding portions of the cutting edges 12 are disposed rearwardly of a plane passing between said edges and through the longitudinal axis of the tool as viewed in Fig. 1.

In other words the inner or leading portions of the cutting edges 10 are staggered as are the leading portions of the edges 12.

It is preferable that the cutting edges 10 be arranged so that their outer portions incline rearwardly while similar portions of the cutting edges 12 incline forwardly relative to the direction of rotation of the tool, as indicated by the arrow in Fig. 1.

The cutting edges 10 may be called positive cutting edges while the edges 12 may be called negative edges.

It will be noted that the faces 11 below or inwardly of the cutting edges 10 incline rearwardly of said cutting edges to provide what may be called a positive rake, while the faces 13 inwardly of cutting edges 12 incline forwardly and may be called a negative rake.

The cutting edges and faces may be formed by various machining and grinding operations to provide the relationship and arrangement shown and described.

It has been found that the countersink tool by reason of its novel construction and arrangement may be operated at a higher speed than may those of the prior art while at the same time objectionable chatter is eliminated with a rapid cutting speed so as to produce round and smooth countersunk holes, all of which may be accounted for by the fact the cutting edges are constantly changing relationship as the tool sinks into the work while at the same time one cutting edge offsets and supports an opposite one.

What it is desired to claim and secure by Letters Patent of the United States is:

A countersink tool adapted for a cutting action when rotated in a certain direction comprising in combination, a body having cutting edges on the forward end thereof arranged to extend generally radially and rearwardly in diverging relation from a forward central point of the tool, said cutting edges arranged to provide two pairs thereof with the edges of each pair extending outwardly radially from opposite sides of the longitudinal axis of the tool, the innermost portions of the cutting edges of one pair thereof disposed adjacent said longitudinal axis and forwardly relative to the certain direction of rotation of said tool and to a plane passing between said edges and through said longitudinal axis and the innermost portions of the cutting edges of the other pair thereof disposed adjacent said longitudinal axis and rearwardly relative to the said certain direction of rotation of said tool and to another plane passing between said cutting edges which is disposed at right angles to said first-named plane and passes through said longitudinal axis, the cutting edges of said one pair converging from the innermost portions thereof outwardly relative to said first-named plane and the cutting edges of said other pair converging from the innermost portions thereof outwardly relative to said other plane.

JOSEPH J. MANEWICH.